United States Patent [19]
Cayle

[11] 3,718,739
[45] Feb. 27, 1973

[54] TREATING LACTASE DEFICIENCY WITH AN ACTIVE LACTASE
[75] Inventor: Theodore Cayle, Morganville, N.J.
[73] Assignee: Baxter Laboratories, Inc., Morton Grove, Ill.
[22] Filed: June 15, 1971
[21] Appl. No.: 153,423

Related U.S. Application Data
[62] Division of Ser. No. 812,348, April 1, 1969, Pat. No. 3,629,073.

[52] U.S. Cl. ............................................424/94
[51] Int. Cl. ..........................................A61k 19/00
[58] Field of Search .................................424/94

*Primary Examiner*—Richard L. Huff
*Attorney*—Robert G. Pollock et al.

[57] ABSTRACT

This invention relates to the administration of lactase from *Aspergillus niger* to lactase-deficient mammals.

2 Claims, No Drawings

TREATING LACTASE DEFICIENCY WITH AN ACTIVE LACTASE

This application is a division of my application, Ser. No. 812,348, filed Apr. 1, 1969, now U.S. Pat. No. 3,629,073.

This invention relates to lactase and, more particularly, to an acid-active, acid-stable lactase enzyme preparation suitable for the hydrolysis of lactose in acid media.

Whole milk normally contains about 5 percent lactose. Milk and products derived from milk which contain lactose, for example, butter, cheese, whey, non-fat milk solids, ice cream, and the like, have long been used as important nutrient components of human or animal diets. While whole milk constitutes a particularly large proportion of the normal infant ration, milk and milk containing products also provide a substantial complement to the usual adult diet.

Lactose, or milk sugar, is a disaccharide carbohydrate which is hydrolyzed during the digestive process to glucose and galactose. This hydrolysis is catalyzed by the enzyme lactase, or beta-galactosidase. Although this enzyme is normally present in the intestinal juices and mucosa, recent investigations have shown that a significant portion of the human population is lactose intolerant or lactase deficient. Kern et al., *J. Am. Med. Ass'n.*, Vol. 195, pp. 927-30 (1966). Consequently, there is a need for a dietary supplement of lactose-hydrolyzing lactase enzymes in these individuals.

Lactose-hydrolyzing lactase enzymes are known to be produced by various yeasts, bacteria and fungi. Among the organisms heretofore disclosed as useful for this purpose are yeasts such as *Saccharomyces fragilis*, *Torula cremoris* and *Torula utilis*, bacteria such as *Escherichia coli* and *Lactobacillus bulgaricus*, fungi such as *Aspergillus oryzae*, *Asperguillus flavus* and *Aspergillus Niger*, and various other microorganisms such as those described in U.S. Pat. Nos. 2,681,858, 2,781,266 and 2,809,113. The lactase enzyme preparations produced by these organisms generally have pH optimums on the alkaline side or in the weakly acid pH range of about 5-7. Yeasts, which are the primary source of commercial lactases, are known to produce lactases having pH optimums of about 7. Most of these conventional lactase enzyme preparations contain other enzymes in admixture therewith, for example, proteases and amylases, which are the predominant components in the mixture.

In the stomach the gastric fluid provides strongly acidic conditions in the pH range of about 1 to 3. Therefore, the activity of lactase enzyme preparations which are generally highly effective in alkaline or weakly acidic media are for the most part destroyed or inactivated when contacted with the gastric fluid.

Accordingly, it is an object of the present invention to provide an acid-active, acid-stable lactase enzyme preparation suitable for the hydrolysis of lactose in acid media.

It is another object of the present invention to provide an acid-active, acid-stable enzyme preparation suitable for oral ingestion.

It is still another object of the present invention to provide a method for the hydrolysis of lactose in milk and milk products.

It is a further object of the present invention to provide a method of reducing lactase deficiency in an animal.

Other objects and advantages of the present invention will be apparent to those skilled in the art after reading this specification and the appended claims.

In accordance with the present invention, an acid-active, acid-stable lactase enzyme preparation suitable for the hydrolysis of lactose in acid media is provided by growing a culture of *Asperguillus niger* and separating therefrom a lactase enzyme preparation which is stable in the range of pH 2-9, exhibits at least about 90 percent of its activity at pH 2.5-5.0 and contains at least about 50,000 Lactase Units (LU) per gram of enzyme preparation.

In the copending application of Harvey and Viebrock, U.S. Ser. No. 812,347, filed Apr. 1, 1969, a method for the production of an acid-active, acid-stable lactase enzyme from *Aspergillus niger* as described herein is disclosed. This method comprises growing a culture of *Aspergillus niger* under aerobic fermentation conditions, extracting the growth product with water, slurrying the extract with a hydrated aluminum silicate adsorbent at a pH of from about 3 to about 6 to adsorb an active lactase component, separating the precipitate and releasing the active lactase component therefrom by adjusting the pH to about 7 to about 8 with an aqueous alkaline reagent. The disclosure of said method in said co-pending application is incorporated herein by reference.

As used herein, the term Lactase Unit (LU) is defined as that quantity of enzyme which will produce $10^{-8}$ moles of o-nitrophenol (ONP) per minute, at 37° C, pH 4.4, at a concentration of o-nitrophenyl-beta-D-galactoside (ONPG) of 0.0005 M.

The assay procedure employed for determining lactase activity is as follows:

DETERMINATION OF β-GALACTOSIDASE (LACTASE) ACTIVITY

Reagents 1. a. Stock Buffer: Prepare a McIlvaine phosphate-citrate buffer, 0.1 M, pH 4.4.
   b. Buffer For Use: Dilute one part of the stock buffer with ten parts of water (0.01 M).
2. Carbonate Solution: 1.1 M sodium carbonate, 0.01 M EDTA, disodium salt.
3. Substrate: o-Nitrophenyl-β-D-galactoside (Mann Research Laboratories, Inc., 136 Liberty Street, New York City.) Dissolve 150 mg. ONPG in 100 ml. distilled water Aliquots of convenient size may be frozen and stored until needed.
4. o-Nitrophenol (Eastman Organic Chemicals, Rochester, N.Y.). Stock Solution (0.001 M): Dissolve 139.11 mg. ONP in 50 ml. ethanol. Dilute to 1,000 ml. with distilled water.

Procedure

A. A reference curve is prepared with increments of o-nitrophenol. Dilute one part of the ONP stock solution with nine parts of the 0.01 M buffer. Add from 1 to 10 ml. of the diluted solution, in 1 ml. (0.5 Lactase Unit) increments, to a series of 10 test tubes, and make each tube to a final volume of 10 ml. with buffer. Add 1 ml. of carbonate solution to each tube. Determine absorbance in a colorimeter at 400–420 mµ. If a Klett instrument is used, employ No. 42 filter. Plot colorimeter values against moles of ONP per test tube. Since $10^{-6}$ moles of ONP produced under the conditions of the assay correspond to 5 Lactase Units (as hereinbefore defined), the plot can be made of colorimeter readings directly against Lactase Units.

B. The test enzyme dissolved in buffer in a total volume of 9 ml. and containing from 1–5 Lactase Units is added to a test tube. Enzyme solution and substrate are atempered separately at 37° C. Add 1 ml. of substrate to the tube containing the enzyme, mix well, and incubate for exactly 20 minutes. Add 1 ml. of carbonate solution and read in a colorimeter against a substrate blank incubated without enzyme, but otherwise treated in the same manner. If a hazy or colored enzyme solution is used, an enzyme blank must be employed. This can be prepared by incubating the substrate as above, and adding the enzyme after the addition of carbonate solution.

Calculations of Lactase Activity

The activity of the enzyme test solution is determined from the reference curve. The LU of the enzyme preparation is determined by dividing the units in the test by the grams of enzyme in the test.

EXAMPLE

If 0.1 mg. of enzyme in the test solution is responsible for the production of $10^{-6}$ moles of ONP under the conditions of the test, this test solution contains 5 LU.

LU of preparation = 5 LU/1 × $10^{-4}$ g. = 50,000 LU/g.

The *Aspergillus niger* used in this invention is a common and well-known species of microorganism, described in detail by Thom and Raper, "Manual Of The Aspergilli," published by Williams & Wilkins Co., Baltimore, 1945, at pages 214 to 240, which are incorporated herein by reference for background information. Illustrative examples of this fungal species are on deposit in stock cultures and available to the public in the permanent collection of the Northern Utilization and Research Division, Agricultural Research Service, U.S. Department of Agriculture, Peoria, Ill.; under accession numbers NRRL 326, NRRL 330, NRRL 334, NRRL 337, NRRL 346 and NRRL 697. Other illustrative examples of this organism are available to the scientific community and other members of the public from the American Type Culture Collection, Rockville, Md., under the deposit numbers ATCC 13,496 ATCC 13,497. It will be understood that the present invention is not limited to the use of these representative examples of *Aspergillus niger* which are set forth for purposes of illustration and not limitation.

For purposes of oral ingestion, it is desirable to provide the herein-defined lactase enzyme preparation for administration in unit dosage form such as, for example, tablets, pills, capsules, powders, wafers, cachets and granules, or solutions, suspensions and dispersions in aqueous or non-aqueous vehicles, including syrups, elixers, and the like.

In preparing solid compositions of the lactase enzyme preparation of this invention, for example, tablets, the active lactase enzyme preparation preferably is mixed with conventional solid fillers or carriers such as cornstarch, talc, calcium phosphate, calcium sulfate, calcium stearate, magnesium stearate, steric acid, glyceryl mono- and distearate, sorbitol, mannitol, gelatin, natural or synthetic gums such as carboxymethyl cellulose, methyl cellulose, alginate, dextran, acacia gum, karaya gum, locust bean gum, tragacanth and the like diluents, binders, lubricants, disintegrators, coloring and flavoring agents.

Suitable liquid forms of the novel composition of this invention can be prepared by incorporating the active lactase enzyme preparation in aqueous or non-aqueous dispersions, suspensions, and solutions with conventional liquid carriers such as, for example, glycerol and edible glycols, edible oils such as cottonseed oil, soybean oil, corn oil, peanut oil, safflower oil and other triglyceride oils, dispersing or suspending agents such as the aforesaid natural and synthetic gums and various other diluents and vehicles.

Any conventional method of tableting, encapsulating, microencapsulating, and the like can be used for preparing unit oral dosage forms of the lactase enzyme preparation of the invention. Since the lactase enzyme preparation of this invention is both active and stable in the low acid pH range approximating the acidity of the gastric fluid, it is not necessary to use enteric coating procedures and the like to protect the active lactase enzyme in the digestive system. However, in certain cases it may be desirable to enterically coat the oral dosage form of the lactase enzyme preparation. Accordingly, conventional methods of enteric coating are also contemplated within the scope of this invention.

The quantity of lactase enzyme preparation employed in the total oral dosage form can vary within wide limits, depending in part upon the lactase activity of the particular enzyme preparation, the magnitude of the lactase deficiency or lactose intolerance in the particular subject requiring the dietary supplement of lactase and the particular dietary characteristics of these subjects.

In general, the amount of lactase enzyme preparation in the unit oral dosage form preferably is sufficient to provide that amount of lactase enzyme needed to hydrolyze the lactose normally present or normally produced in the subject requiring the lactase supplement.

The lactase enzyme preparation of this invention can also be produced in powdered or granular form for direct admixture with the normal food and feed products used by the subjects requiring the dietary supplement of lactase. For example, in the case of an infant requiring a dietary supplement of lactase, a suitable amount of the lactase enzyme preparation of this invention in a powdered or granular form can be added directly to the milk or other food regimen of that infant in any suitable amount. In the case of an animal that normally requires a dietary regiment of whey, the lactase enzyme preparation of this invention in a powdered or granular form can be added directly to this whey.

In accordance with another aspect of the invention, the acid-active, acid-stable lactase enzyme preparation derived from *Aspergillus niger* is used for removal of the lactase initially present in acid whey, such as produced during cottage cheese manufacture.

Other methods of employing the lactase enzyme preparation of this invention will be apparent to those skilled in the art.

The following examples will further illustrate the present invention although the invention is not limited to these specific examples. All percentages and parts herein are on a weight basis unless otherwise specified.

EXAMPLE 1

A lactase enzyme preparation having an activity of at least 50,000 LU per gram is prepared as follows:

To 100 parts of wheat bran was added 60 parts of 0.2N hydrochloric acid containing 0.62 ppm of $ZnSO_4$, 0.62 ppm of $FeSO_4$ and 0.88 ppm $CuSO_4$. The mixture was sterilized with steam and, after cooling, was inoculated with a sporulated inoculum of *Aspergillus niger*. The inoculated bran was maintained at a temperature of 30° C by passing moist air through the mixture until testing indicated the presence of substantial quantities of lactase after growth for 4 days.

An aqueous extract of the growth product was prepared by washing the above mixture with four volumes of water. The extract was concentrated by evaporation to a specific gravity of 1.1.

A suitable quantity of the above aqueous extract was treated with calcium hydroxide and the pH brought to 6.5–6.8. The mixture was filtered after stirring for approximately 30 minutes.

A 10 percent aqueous bentonite slurry was added to the above filtrate in an amount of about 2.5–3 percent by weight of the filtrate. The pH of the mixture was adjusted to 3.9–4.1 and stirred for 30 minutes, after which time it was filtered. The filter cake was sparged with a 45 percent aqueous acetone solution.

The filter cake was then dispersed in a quantity of water equal to approximately twice the cake weight and ammonium hydroxide was added until the pH of the mixture was in the range of 6.9–7.2. After stirring for 30 minutes, the mixture was filtered.

The filtrate was then evaporated to a dry product by spray drying.

The *A. niger* lactase enzyme preparation produced in accordance with the above method has an activity of at least 50,000 LU/gram, and enzyme preparations can be obtained with activities of about 500,000 to 600,000 LU/gram by this method, depending upon the activity and purity of the starting inoculum of *Aspergillus niger*.

EXAMPLE 2

The activity and stability of the lactase enzyme preparation of Example 1 is shown as follows:

Effect of pH on Activity

The activity of the A. niger lactase as a function of pH was studied with lactose as substrate. Activity was measured at 37° C and 55° C, and the results are shown in Table I.

TABLE I

Effect of pH on Relative Activity of *A. niger* Lactase at 37°C and 55°C — Substrate Lactose

| pH | Relative Activity - Percent | |
|---|---|---|
| | 37°C | 55°C |
| 1.9 | 32 | |
| 2.1 | 76 | |
| 2.5 | 92 | |
| 2.8 | 98 | 95 |
| 3.2 | 100 | 98 |
| 3.75 | 100 | 100 |
| 4.5 | 96 | 99 |
| 5.5 | 81 | 89 |
| 6.25 | 46 | 63 |
| 6.8 | 24 | 39 |
| 7.2 | 14 | 21 |
| 7.6 | 9 | 13 |

At either temperature at least 50 percent of the maximum activity is exhibited between pH 2 and 6, or at least 90 percent between pH 2.5 and 5.0.

Effect of Temperature on Activity

The relative activity of the *A. niger* lactase was determined at pH 3.5 on a lactose substrate at 30°, 37° and 55° C. These data are summarized in Table II.

TABLE II

Effect of Temperature on Relative Activity of *A. niger* Lactase at pH 3.5 — Substrate Lactose

| Temperature °C | Relative Activity-present |
|---|---|
| 30 | 50 |
| 37 | 100 |
| 55 | 100 |

Stability as a Function of pH

The stability of *A. niger* lactase as a function of pH was established. An aqueous solution of the enzyme was incubated at a concentration of 0.1 percent, at various pH values and at 37° C for one hour. The solution was then adjusted to pH 4.3 and assayed on lactose to establish the residual activity. The data in Table III were obtained:

TABLE III

The Stability of the *A. niger* Lactase in Solution at Various pH Values Time 1 Hour at 37°C

| pH | % Activity Retained |
|---|---|
| 2 | 80 |
| 3 | 100 |
| 5 | 100 |
| 7 | 100 |
| 9 | 40 |
| 11 | 0 |

Aqueous solutions of the *A. niger* lactase retain full activity after exposure at 37° C for 1 hour between pH 3 and pH 7.5, or at least 90 percent between pH 2.2 and pH 8.3, and at least 50 percent activity between pH 1.6 and pH 8.9.

Stability as a Function of Temperature

The stability of the *A. niger* lactase as a function of temperature was established. An aqueous solution of the enzyme was incubated at a concentration of 0.1 percent at the test temperature for 1 hour at pH 5.2 (in distilled water) and at pH 3.5 (in 0.01M acetate) and then assayed with ONPG at 37° C, at pH 3.5. The following data were obtained:

TABLE IV

Stability of *A. niger* Lactase in Solution at Various Temperature Time 1 Hour

| Temperature °C | % Activity Retained pH 3.5 | pH 5.2 |
|---|---|---|
| 25 | 97.5 | 100 |
| 35 | 87.5 | 100 |
| 45 | 92 | 97.5 |
| 55 | 84 | 97.5 |

At least 97 percent of the activity of the *A. niger* lactase is retained at all temperatures at pH 5.2, and the maximum loss at pH 3.5 at 55° C is 16 percent.

EXAMPLE 3

The activity and stability of the *A. niger* lactase enzyme preparation of Example 1 was compared with the activity and stability of a commercially available lactase enzyme preparation derived from *S. fragilis* as follows:

Stability as a Function of PH

The stability of the *A. niger* lactase and *S. fragilis* lactase as a function of pH was established and compared. Each enzyme was incubated at a concentration of 0.1 percent, at the test pH, at 37° C for 1 hour. The *A. niger* lactase was then adjusted to pH 4.3 and assayed on lactose to establish the residual activity. The *S. fragilis* enzyme was incubated in the presence of 0.1M phosphate in view of the reports in the literature (see reference*) (*Davies, *J. Gen. Microboil.*, Vol. 37, p. 81 et seq. (1964).) that this enzyme is stable in solution only in the presence of this salt. It was when assayed at pH 7 on ONPG. The following data were obtained:

TABLE V

| pH | % Activity Retained A. niger Lactase | S. fragilis Lactase |
|---|---|---|
| 2 | 80 | — |
| 3 | 100 | 0 |
| 5 | 100 | 42 |
| 7 | 100 | 100 |
| 9 | 40 | 0 |
| 11 | 0 | 0 |

When the above data are plotted with activity retained as a function of the incubation pH, it is seen that the *A. niger* lactase retains 100 percent of its activity after exposure at 37° C for 1 hour between pH 3 and 7.5, or at least 90 percent between pH 2.2 and 8.3, and at least 50 percent of its activity between pH 1.6 and 8.9, whereas the *S. fragilis* enzyme retains 100 percent of its activity only at pH 7, and 50 percent of its activity under similar conditions between pH 5.2 and 8.

Stability as a Function of Temperature

The stability of the *A. niger* lactase and *S. fragilis* lactase as a function of temperature was established and compared. Each enzyme was incubated at a concentration of 0.1 percent at the test temperatures for 1 hour. The *A. niger* lactase was incubated at pH 5.2 in distilled water, and pH 3.5 in 0.01M acetate. The *S. fragilis* enzyme was incubated at pH 7.3 in distilled water and pH 7.0 in 0.1M phosphate. Both enzymes were assayed on ONPG at 37° C, at pH 3.5 with the *A. niger* lactase and at pH 7 with the *S. fragilis* enzyme. The following data were obtained:

TABLE VI

| | % Activity Retained | | | |
|---|---|---|---|---|
| Temperature | A. Niger Lactase pH 3.5 | pH 5.2 | S. fragilis Lactase pH7.0(PO$_4$) | pH7.3 |
| 25 | 97.5 | 100 | 100 | 72 |
| 35 | 87.5 | 100 | 91 | 37.5 |
| 45 | 92 | 97.5 | 18.7 | 11.8 |
| 55 | 84 | 97.5 | 0 | 0 |

When the above data are plotted with activity retained as a function of incubation temperature, it is seen that at least 97 percent of the activity of the *A. niger* lactase is retained at all temperatures at pH 5.2, and the maximum loss at pH 3.5 at 55° C is 16 percent. On the other hand, the *S. fragilis* enzyme loses over 80 percent of its activity at 45° C and 100 percent of its activity at 55° C, despite the presence of 0.1M phosphate. In the absence of the stabilizing salt, over 60 percent of the activity is lost at 35° C, and progressively more is lost at the higher temperatures.

EXAMPLE 4

To 100 ml of an acid whey, at a pH of 4.3, containing 4.96 grams of lactose, was added 64 mg of a lactase enzyme preparation (prepared in accordance with Example 1) containing a total of 36,800 Lactase Units. This was allowed to incubate at 55° C, and samples of the hydrolyzate were withdrawn periodically and the extent of lactose hydrolysis determined as a function of time. Table VII shows the data obtained:

TABLE VII

Hydrolysis of Lactose in Acid Whey with *A. niger* Lactose

| Time (min.) | % Hydrolysis |
|---|---|
| 0 | 0 |
| 5 | 25 |
| 10 | 31 |
| 20 | 43 |
| 40 | 57 |
| 60 | 68 |
| 90 | 76 |
| 120 | 85 |
| 150 | 89 |
| 180 | 93 |
| 210 | 95 |
| 240 | 95 |

These data indicate that 50 percent of lactose present in acid whey can be hydrolyzed within 30 minutes at 55° C, and 95 percent can be removed within 3½ hours, by employment of the lactase enzyme preparation of the present invention.

EXAMPLE 5

An aqueous oral suspension containing in each 5 ml., 0.5 gram of the lactase enzyme preparation produced in accordance with Example 1 is prepared from the following materials:

| | |
|---|---|
| Lactase (25,000 LU) | 0.5 gram |
| Glycerol | 1.5 ml |
| Tragacanth powder | 0.01 gram |
| Orange oil flavor | 0.001 gram |
| Water, q.s. to | 5 ml |

EXAMPLE 6

A lot of 100 tablets for oral use, each containing 0.5 gram of the lactase enzyme preparation produced in accordance with Example 1 is prepared from the following materials:

| | | |
|---|---|---|
| Lactase (50,000 LU) | | 1 gram |
| Cornstarch | | 45 grams |
| Magnesium stearate | | 1 gram |
| Gelatin Total: | 50 grams | 3 grams |

The aqueous suspension and tablets of Examples 5 and 6, respectively, are suitable for oral ingestion for the hydrolysis of lactose.

Various other examples of the invention and modifications and adaptations of the foregoing examples will be apparent to the person skilled in the art after reading the foregoing specification and appended claims without departing from the spirit and scope of the invention. All such examples, modifications and variations are included within the scope of the appended claims.

What is claimed is:

1. The method of reducing lactase deficiency in mammals comprising orally administering to a lactase deficient mammal an amount of lactase enzyme sufficient to hydrolyze the undigested lactose normally present in said mammal, said lactase enzyme being an acid-active, acid-stable lactase enzyme preparation obtained from the growth product of a culture of *Aspergillus niger* by absorption with hydrated aluminum silicate at a pH of from about 3 to about 6 followed by release of the enzyme preparation by adjustment to a pH of from about 7 to about 8, said lactase enzyme preparation being stable in the range of pH 2–9, exhibiting at least about 90 percent of its activity at pH 2.5–5.0 and at 37° C and containing at least 50,000 Lactase Units per gram of enzyme preparation.

2. The method of claim 1 in which the enzyme preparation is administered in admixture with an edible carrier.

* * * * *